United States Patent
Helliwell et al.

(10) Patent No.: US 9,760,464 B1
(45) Date of Patent: Sep. 12, 2017

(54) MEMORY LEAK DETECTION

(71) Applicant: Amazon Technologies, Inc., Seattle, WA (US)

(72) Inventors: Martin Robert Helliwell, Morgan Hill, CA (US); Cyrille Habis, Mountain View, CA (US); Rakesh Kulangara, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 150 days.

(21) Appl. No.: 14/671,180

(22) Filed: Mar. 27, 2015

(51) Int. Cl.
  *G06F 11/30* (2006.01)
  *G06F 11/07* (2006.01)
  *G06F 9/50* (2006.01)

(52) U.S. Cl.
  CPC ........ *G06F 11/3037* (2013.01); *G06F 9/5016* (2013.01); *G06F 11/0778* (2013.01); *G06F 11/301* (2013.01); *G06F 2209/5022* (2013.01)

(58) Field of Classification Search
  CPC .................................................. G06F 11/366
  See application file for complete search history.

(56) References Cited

U.S. PATENT DOCUMENTS

| | | | | |
|---|---|---|---|---|
| 7,257,692 B2* | 8/2007 | Schumacher | ....... | G06F 11/0751 711/170 |
| 7,293,142 B1* | 11/2007 | Xu | ...... | G06F 11/3648 707/999.202 |
| 7,313,661 B1* | 12/2007 | Dmitriev | ........... | G06F 12/0253 711/159 |
| 7,587,709 B2* | 9/2009 | Chilimbi | ............ | G06F 11/3636 717/128 |
| 8,201,026 B1* | 6/2012 | Bornstein | .......... | G06F 9/45508 714/45 |
| 8,429,620 B2* | 4/2013 | Chen | ................... | G06F 11/3636 714/42 |
| 8,473,789 B2* | 6/2013 | Callaghan | ............ | G06F 11/366 714/42 |
| 9,003,233 B2* | 4/2015 | Komissar | ........... | G06F 11/3037 714/38.1 |
| 9,164,872 B2* | 10/2015 | Moser | ..................... | G06F 11/30 |
| 9,454,454 B2* | 9/2016 | Abraham | ............ | G06F 11/3612 |
| 2011/0066897 A1* | 3/2011 | Bumgarner | ......... | G06F 11/3612 714/46 |

(Continued)

*Primary Examiner* — Christopher McCarthy
(74) *Attorney, Agent, or Firm* — Eversheds Sutherland (US) LLP

(57) ABSTRACT

A leak detection system may be configured to receive a plurality of memory use reports periodically from a user device. The memory use reports may include an indication of memory that may be used and/or allocated by/to a particular process, such as a process that may currently be running on the user device. The memory use report may further provide a relatively granular view of the allocation of memory associated with the process, such as by type of memory and/or category of memory associated with the process. The leak detection system may use the plurality of memory use reports to generate a memory profile associated with the process and particular memory types and/or categories of memory allocation. By analyzing the memory profiles, the leak detection system may be configured to identify a memory leak associated with the process on the user device.

18 Claims, 6 Drawing Sheets

(56) References Cited

U.S. PATENT DOCUMENTS

| | | | |
|---|---|---|---|
| 2011/0161956 A1* | 6/2011 | Vennam | G06F 11/366 718/1 |
| 2011/0252276 A1* | 10/2011 | Tsai | G06F 12/0253 714/16 |
| 2014/0129793 A1* | 5/2014 | Crosby | G06F 9/5016 711/170 |
| 2014/0372743 A1* | 12/2014 | Rogers | H04L 9/3234 713/2 |
| 2014/0380017 A1* | 12/2014 | Robin | G06F 12/023 711/171 |
| 2015/0234700 A1* | 8/2015 | Qin | G06F 11/0778 714/38.11 |
| 2015/0363113 A1* | 12/2015 | Rahman | G06F 3/0653 707/718 |
| 2016/0070633 A1* | 3/2016 | Abraham | G06F 11/3612 714/47.3 |

* cited by examiner

MEMORY LEAK DETECTION

BACKGROUND

Memory leaks are a type of resource leak that may occur over time, where a computer application incorrectly handles memory allocations. A memory leak may occur if an application requests and receives a memory allocation and when the application no longer needs the memory allocation, the application fails to release its allocation. Over time, the amount of unreleased memory may keep growing and may lead to reduced available memory and increased segmentation of the memory that is available. This may lead to degraded performance and inefficient operation of systems, such as computers and personal user devices. In some cases, if memory leaks have progressed long enough, then substantial degradations to system performance may be experienced, such as due to thrashing. With mobile communications and personal electronic devices that are operating substantially all the time and generally have less memory capacity relative to desktop and laptop systems, the effects of memory leaks may accumulate over time and may be relatively more detrimental to system performance.

BRIEF DESCRIPTION OF THE DRAWINGS

The detailed description is set forth with reference to the accompanying figures. The use of the same reference numbers in different figures indicates similar or identical items; however, various embodiments may utilize elements and/or components other than those illustrated in the figures.

DETAILED DESCRIPTION

Overview

Figure 1:
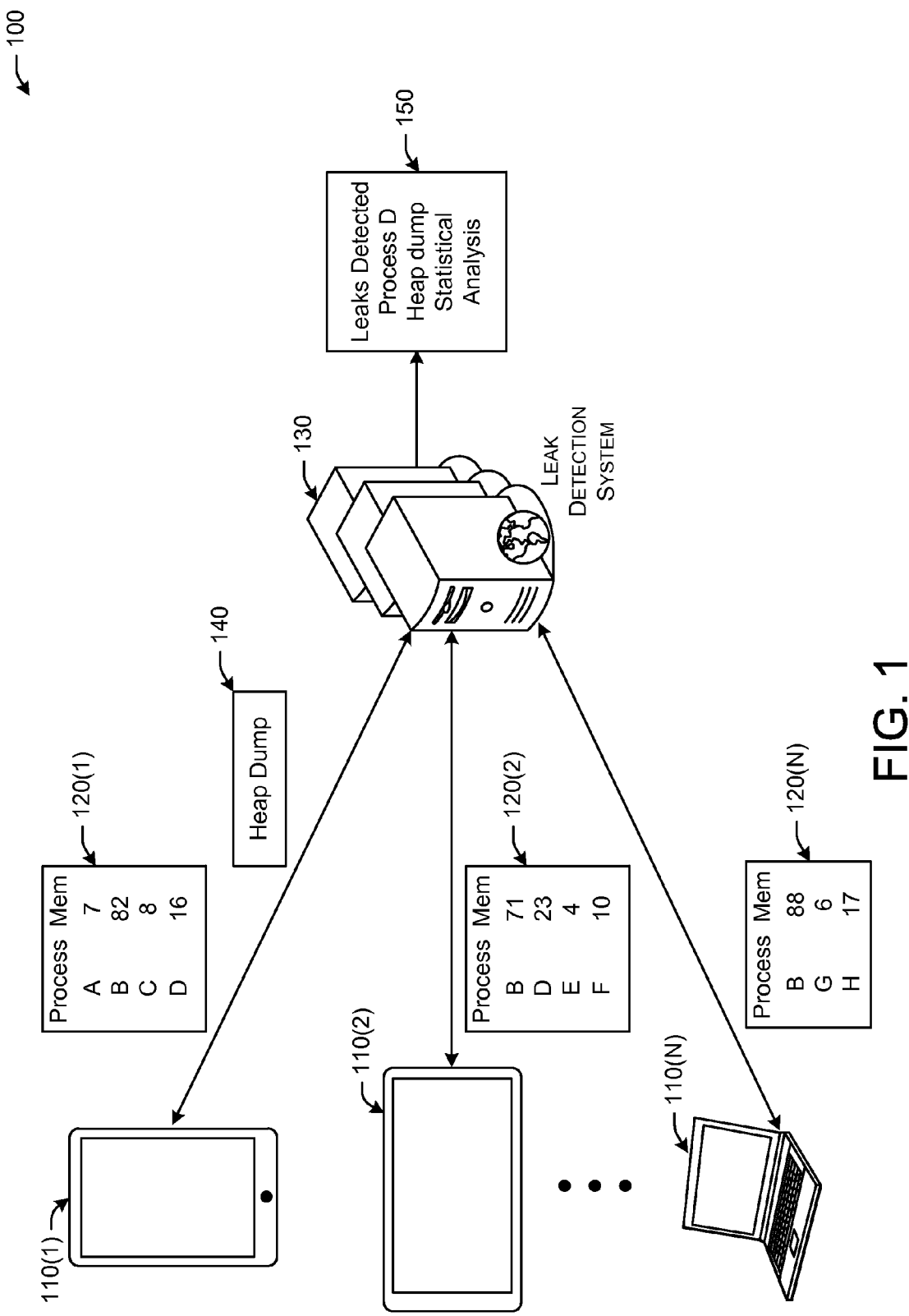
FIG. 1 is a schematic diagram that illustrates an example environment where one or more user devices interact with an example leak detection system to transmit memory use reports, in accordance with example embodiments of the disclosure.

Example embodiments of the present disclosure may allow for receiving memory use reports periodically from one or more user devices. A memory use report, as generated and received from a user device, may show a snapshot (e.g., at that point in time) of processes that may have memory allocated to them on the user device. The processes that have memory allocations may or may not be running on the user device when the memory use report is generated.

According to example embodiments, there may be a plurality of user devices that may be executing any variety of application(s), such as application(s) that provide functionality that may be desired by a user of the user device. These application(s) may launch one or more processes that may reserve memory, such as dynamic memory, and/or free memory allocations, as needed for that process. For example a particular process, when being executed, may reserve (e.g., by malloc( ) function) a particular amount of memory (e.g., measured in kilobytes, pages, blocks, etc.). When that process no longer needs the allocated memory, it may free its reserved memory (e.g., by free( ) function). In some cases, applications may operate in a fashion where allocated memory, when no longer needed by a particular process is not subsequently freed, resulting in memory leaks. Theses memory leaks may be, for example, a result of sloppiness in writing the code for the processes and/or function calls of the application. The methods and systems, as described herein, may be configured to gather data associated with memory use and/or allocations of particular processes, analyze that memory use and/or allocation data, identify potential memory leaks using the analysis of the memory use and/or allocation data, and/or if a memory leak is detected, report that memory leak with information that might assist in finding the source of the memory leak within the source code of the leaky application. In example embodiments, the user device may be any suitable user device, such as a smartphone, a tablet computing device, a notebook computer, or the like.

The plurality of user devices may be configured to generate a memory use report to transmit to a leak detection system, in accordance with example embodiments of the disclosure. In accordance with some example embodiments of the disclosure, a particular user device may be configured to generate the memory use report when solicited to do so by any suitable entity, such as the leak detection system or a user associated with the user device. The user device may further be configured to generate and transmit a memory use report periodically. The periodicity of generating the memory use report may be set by the user device, by the leak detection system, by software settings that are set by the manufacturer of the user device, a user of the user device, or any other suitable entity. The memory use report may provide an indication of the amount and/or type of memory used by each of the applications that are running and/or had run on the user device. For example, for a particular process (e.g., as referenced by process identifier (pid)), the memory use report may provide an indication of the allocated and/or mapped memory for that process as virtual set size (Vss) (e.g., allocated memory size) and/or resident set size (Rss) (e.g., mapped memory size). Furthermore, an indication of the type of allocation may also be provided, such as anonymous memory allocation, graphical memory allocation, shared memory allocation, single memory allocation, true type front memory allocation, data heap, Dalvik heap (e.g., virtual machine of Android® operating system), or the like. Any variety of memory and/or virtual memory allocation (VMA) tracer application may be used to identify the memory that is allocated to any variety of processes on a user device. This type of process level memory allocations, further identified by memory type and bins, may be used to generate the memory use report at the user device. In example embodiments, the mapped and/or allocated memory of a particular process, as indicated in particular memory use report, may by bytes (e.g., kilobytes, megabytes, etc.) of memory, blocks of memory, pages of memory, or any other suitable measure of memory size.

The user device may still further be configured to generate a memory heap dump. A memory heap dump may be generated by the user device upon receiving a request to do so, such as by a request from the leak detection system. The memory heap dump may be associated with a particular process, such as a Java® process that may be resulting in memory leaks on the user device. In example embodiments, the leak detection system may request the user device to generate and send a heap dump of a process that may have been identified by the leak detection system as causing memory leaks. Therefore, in example embodiments, the memory heap dump may be generated if the leak detection system detects a memory leak associated with one or more processes operating on the user device. The memory heap dump may include information with greater granularity than the memory use reports about how memory for a particular process is allocated. For example, the memory heap dump may include memory allocations to individual objects (e.g., objects, classes, fields, primitive values, references, stacks, variables, etc.). The memory heap dump information may be used by a software developer to determine what objects associated with the process are present and analyze the same to better pinpoint what functions or objected of the process may be causing memory leaks.

The leak detection system may be a remote system (e.g., in the cloud) and configured to receive one or more memory use reports from one or more user devices. In example embodiments, the leak detection system may receive a memory use report from a particular user device on a periodic basis. For example, the leak detection system may receive a memory use report daily from a particular user device. As another example, the leak detection system may receive a memory use report every 20 seconds from the particular user device. It will be appreciated that the leak detection system may be receiving memory use reports periodically from a plurality of user devices. In example embodiments of the disclosure, the leak detection system may solicit the memory use reports from the user devices. In these example embodiments, the leak detection system may generate a request for a memory use report from a particular user device and send the same to that particular user device. In response to the request, the leak detection system may receive a memory use report from the particular user device. The leak detection system may be configured to organize and store the memory use reports that may be received from the various user devices over time, such as in a datastore. As discussed above, the memory use report may have a relatively high level of granularity with regards to indicating the type and category of memory allocated to a particular process. For example, the memory report may indicate the Vss and Rss for various category or bins of memory, such as anonymous memory allocation, graphical memory allocation, shared memory allocation, single memory allocation, true type front memory allocation, data heap, Dalvik heap, or the like, for the particular process.

The leak detection system, as disclosed herein, may be configured to receive a time series of memory use reports from a particular user device and generate a data set of memory use over time associated with each process running on the user device. Therefore, the leak detection system, over time, may receive sufficient data from a particular user device to be able to generate a dataset of memory use over time associated with various processes operating on that particular user device. In fact, the leak detection system may be able to generate such a time series of memory data with a memory data type/bin granularity provided in the received memory use reports. For example, the leak detection system may be able to generate a time series of Dalvik allocated memory (e.g., Vss) associated with a particular process. As another example, the leak detection system may be able to generate any one or more of time series of Vss graphical memory, Rss graphical memory, Vss anonymous memory, Rss anonymous memory, Vss shared memory, Rss shared memory, Vss true-type font memory, Rss true-type font memory, Rss code memory, Vss code memory, Rss device mapping memory, Vss device mapping memory, Vss virtual machine memory, Rss virtual machine memory, Vss data memory, Rss data memory, combinations thereof, or the like. It will be appreciated that the memory use reports may provide and the leak detection system may be configured to use a relatively high level of granularity of memory use data with regards to type/bin allocated and/or used memory.

The leak detection system may further be configured to plot or otherwise graphically represent the memory use data by process to an operator of the leak detection system. For example, the leak detection system may present, to an operator, a plot of a particular memory allocation (e.g., type and bin) associated with a particular process over time. For such graphical representations of the memory use, the leak detection system may be configured to plot the time series of memory data that it may generate from the received time series of memory use reports. For example, the leak detection system may be configured to generate and display a plot of the Dalvik Vss as a function of time for a particular process.

The leak detection system may be further configured to use data about memory use over time for particular processes to identify if the process exhibits characteristics that are consistent with that process creating memory leaks. The leak detection system may, in example embodiments, be configured to perform various mathematical and/or statistical analysis on memory use over time data associated with a process to determine if the process is likely generating memory leaks on the user device on which that process is running. This statistical analysis may include various types of comparisons to characteristic that may be present in a memory use profile of a process that is leaky with respect to memory. Statistical tools and/or methods may be used to perform these comparisons, such as regression analysis, student's t-test, chi-square test, Wilcoxon test, calculating cross-correlations, applying averaging functions, filtering, or the like.

In example embodiments, the leak detection system may be configured to filter the memory use over time or memory profile associated with a particular process. This filtering may be to clean fast transients from the memory profile data. The filtering process may use any suitable mechanism, including, for example, sliding window averaging of the data, linear averaging of the data, exponential averaging of the data, thresholded-delta filtering, combinations thereof, or the like. After the filtering process, the data may be analyzed to detect any signatures of a memory leak. In some example embodiments, the leak detection system may determine if there is a monotonic increase in the data allocated to a particular process, as indicated by one or more filtered memory profiles associated with that process. Such a monotonic increase over a relatively extended period of time may be indicative of a memory leak associated with that process. The some further example embodiments, the leak detection system may determine if there is a linear monotonic increase in the memory allocated to a particular process, as indicated by one or more filtered memory profiles associated with that process. A linear monotonic increase in the memory allocated to a particular process over a relatively extended period of time may be indicative of a memory leak associated with that process.

The leak detection system, in example embodiments, may generate a plurality of memory profiles (e.g., time series data of memory allocation of a particular type and category) associated with a particular process. Not all of the memory profiles for a particular process may be equally useful for the purposes of detecting a memory leak associated with a process. The leak detection system may be configured to analyze all or a subset of the memory profiles associated with a particular process for the purposes of detecting a memory leak. The leak detection system may, in example embodiments, be configured to only generate and/or analyze memory profiles that are most likely to result in an accurate detection of memory leak. In other words, the leak detection system may not generate or analyze a memory profile (e.g., a particular time series memory type and bin allocation) if it is relatively less likely than other memory profiles associated with that process to indicate a memory leak. For example, the resident set size (Rss) of mapped shared objects associated with a particular process may be relatively less likely to exhibit indications of a memory leak resulting form that particular process compared to, for example the virtual set size (Vss) of the anonymous memory allocation. In this case, in certain non-limiting examples, the leak detection system may proceed with analyzing the Vss anonymous memory profile and not analyze the Rss mapped shared objects memory profile for the purposes of detecting a memory leak resulting from a process associated with both of the aforementioned memory profiles. In this way, processing bandwidth at the leak detection system may be appropriated to only those profiles that may be relatively more likely to show symptoms of a memory leak.

In example embodiments, the leak detection system may be configured to identify a leak in a particular process and/or application software associated therewith. For example, the leak detection system may identify a monotonic linear increase in the Dalvik Vss associated with a particular process and based thereon, identify a memory leak associated with that process. In these example embodiments, the leak detection system may further be configured to receive a memory heap dump report from the user device on which the process exhibiting symptoms of a memory leak is being executed. The memory heap dump may pertain to the process for which a memory leak is detected or suspected. The leak detection system, in example embodiments, may solicit the heap dump report from a particular user device on which a potential memory leak is detected. In this case, the leak detection system may generate a request for the memory heap dump and may identify the process, such as by process identifier (pid), for the process for which the memory heap dump is desired. The memory heap dump, in example embodiments, may include a variety of information associated with the process at a relatively finer granularity than what may be provided in a memory use report from the user device. The memory heap dump may show objects, classes, stacks, variables, and the like that may be using memory and associated with a particular process. This type of memory heap dump may be utilized, such as by a software developer, to identify what processes and/or interactive history may have taken place associated with the process suspected of creating memory leaks. This information may be used to recreate the situation under which a memory leak may occur with that process in an effort to repair any source code of that process to prevent the detected memory leaks.

In example embodiments, the leak detection system may be configured to generate a report indicating a memory leak associated with a particular process and/or application. This memory leak report may include an identifier of the process and or application from which the memory leak was detected. The memory leak report may, in some example embodiments, further include information indicating the approximate rate of the memory leak detected, such as 1 Kb/hour. The memory leak report, in other example embodiments, may have the memory heap dump and/or select information from the memory heap dump included therein. In accordance with example embodiments of the disclosure, the memory leak report may be in a standard format, such as a format that may be used for the purposes of reporting software bugs and/or other application related issues. For example, the leak detection system may be configured to generate a JIRA® file for the purposes of reporting the detected memory leak to a software developer.

The concepts described above may be understood with reference to FIG. 1. FIG. 1 is a schematic diagram that illustrates an example environment 100 where one or more user devices 110(1), 110(2), 110(N) interact with an example leak detection system 130 to transmit memory use reports 120(1), 120(2), 120(N), in accordance with example embodiments of the disclosure.

The user devices 110(1), 110(2), 110(N), hereinafter referred to individually or collectively as user device 110, in example embodiments, may be any suitable type of electronic device or communications device that can execute applications (e.g., software, computer code, listing of instructions, etc.) thereon. In example embodiments, the user device 110 may be configured to connect to a communications network, such as the Internet, to enable communications with one or more other entities, such as the leak detection system 130. In example embodiments, the user device 110 may be any suitable user device including, but not limited to, a mobile phone, a smartphone, a tablet computing device, an electronic book (ebook) reader, wearable devices, smart watches, netbook computers, notebook computers, laptop computers, desktop computers, personal digital assistants (PDA), web-enabled televisions, video game consoles, set top boxes (STB), smart appliances, cameras, navigation systems, in-vehicle infotainment systems, combinations thereof, or the like.

The user device 110, as described above, may be configured to run one or more applications thereon. Each application may spawn one or more corresponding processes on the user device. These processes may allocate, reserve, map, and/or use memory of various types on the user device 110. As a non-limiting example, suppose a particular navigation application, when operated on a particular user device 110 may launch a variety of individual processes, such as separate processes for each of receiving global positioning satellite (GPS) signals, processing the GPS signals, identifying a current location of the user device 110 on a road map, displaying the location on a touch sensitive screen of the user device, and/or providing navigation instructions to a destination point.

It will be appreciated that the applications that may be run on the user device 110 and processors thereon may be developed by any variety of software developers. In some cases, the applications may be flawed in a manner that one or more actions, interactions, series of actions, and/or series of interactions may result in a memory leak. In some cases, these memory leaks may be very small or may accumulate at a slow rate. However, over time, particularly for modern consumer electronic devices that are on all the time (e.g., continuously operational) or substantially all the time, the memory leaks may accumulate over time to result in increasing levels of unusable memory and/or fragmented memory that may lead to detrimental effects to the performance of the user device 110. The systems and method, as described herein, allow for the identification of memory leaks, even relatively slow memory leaks that may be relatively difficult to identify, on the user device 110.

In example embodiments, each of the user devices 110(1), 110(2), 110(N) may be configured to execute instructions that configure the user devices 110(1), 110(2), 110(N) to generate a corresponding memory use report 120(1), 120(2), 120(N), respectively. The memory use reports 120(1), 120 (2), 120(N), hereinafter referred to individually or collectively as memory use report 120, may include a listing of processes that have memory allocated to them at the time when the memory use report is generated. The memory use reports 120, in some example embodiments and as depicted here, may include a listing of all the processes that may be using memory or have memory allocated to them on the user device 110 with an indication of the corresponding level of memory usage/allocation by/to that process. The processes, as listed in each of the memory use reports 120, may be listed by its process identifier (pid) or any other suitable identifier. It will be appreciated that there may be one or more processes that may be associated with a particular application. In some cases, the pid may be indicative of which application program a particular process may be related.

As shown, different user devices 110 may have some of the same processes running thereon in some cases. In other cases, different user devices 110 may have different processes running thereon. For example, as depicted in memory use report 120(1) and memory use report 120(2), user device 110(1) and user device 110(2) may both be running "Process B" and "Process D," however, user device 110(2) at the time of the generation of memory use report 120(2) was not running "Process A" or "Process C," as user device 110(1) was during the time when it generated memory use report 120(1). Similarly, at that time, user device 110(2) was running "Process E" and "Process F," both of which were not being run on user device 110(1). Therefore, in this manner, by using the memory use reports 120, one can identify which processes are running or are at least using/ allocating memory resources on each of the user devices 110.

In accordance with some example embodiments of the disclosure, a particular user device 110 may be configured to generate the memory use report 120 when solicited to do so by any suitable entity, such as the leak detection system 130. In other example embodiments, instructions being executed on the user device 110 may periodically generate and transmit the memory use report according to a predetermined frequency. The periodicity of generating the memory use report may be set by the user device 110, by the leak detection system 130, by software settings that are set by the manufacturer of the user device 110, a user of the user device 110, or any other suitable entity. For example, a user device 110 may generate and send a memory use report every 5 second. In another non-limiting example, a user device 110 may generate and send a memory use report every minute. In yet another non-limiting example, a user device 110 may generate and send a memory use report every hour. In still yet another non-limiting example, a user device 110 may generate and send a memory use report once per day. Indeed, a user device 110 may generate and send a memory use report with any suitable periodicity.

Although as depicted in FIG. 1, the memory use report shows a total aggregate memory allocation for each process, it will be appreciated that in example embodiments, the user device 110 may be configured to generate memory use reports that have a much finer granularity with respect to the allocation of different types of memory (e.g., graphical, anonymous, Dalvik, data, code, etc.). The memory use report 120 may provide an indication of the amount and/or type of memory used by each of the applications that are running and/or had run on the user device 110. The plurality of user devices 110, after generating corresponding respective memory use reports 120, may be configured to transmit the memory use reports 120 to a leak detection system, in accordance with example embodiments of the disclosure.

The user device 110 may still further be configured to generate a memory heap dump 140. A memory heap dump 140 may be generated by the user device upon receiving a request to do so, such as by a request from the leak detection system 130. The memory heap dump 140 may be associated with a particular process, such as a process that may be resulting in memory leaks on the user device 110. In example embodiments, the leak detection system 130 may request the user device 110 to generate and send a heap dump 140 of a process that may have been identified by the leak detection system 130 as causing memory leaks. Therefore, in example embodiments, the memory heap dump 140 may be generated if the leak detection system 130 detects a memory leak associated with one or more processes operating on the user device. The memory heap dump 140 may include information with greater granularity than the memory use reports 120 about how memory for a particular process is allocated. For example, the memory heap dump 140 may include memory allocations to individual objects (e.g., objects, classes, fields, primitive values, references, stacks, variables, etc.). The memory heap dump 140 information may be used by a software developer to determine what objects associated with the process are present and analyze the same to better pinpoint what functions or objected of the process may be causing memory leaks.

The leak detection system 130 may receive the various memory use reports 120 and analyze those memory use reports to determine if any of the processes running on any of the user devices 110 exhibit characteristics of a memory leak. In particular, the leak detection system may be configured to generate a number of memory profiles for each type of memory (e.g., Rss Dalvik, Vss data, Rss shared, etc.) for each process (e.g., as identified by pid) for each of the user devices 110. As will be appreciated, this may amount to relatively large amount of data gathering, manipulation, storage, and/or analysis by the leak detection system 130. For the purposes of this disclosure, a memory profile may be a time series of memory allocation of a particular type for a particular process and user device 110. The temporal frequency of a particular memory profile may depend on the frequency of receiving the memory use reports 120 from which that particular memory profile was generated. For example, if a particular user device 110 transmits a memory use report every 78 seconds with information of the Rss anonymous memory allocated for "Process A," then the leak detection system 130 may be configured to generate and store a memory profile for Rss anonymous memory allocation for "Process A" from that particular user device 110 with a data point spacing of 78 seconds. That memory profile may be stored in memory and/or storage associated with the leak detection system 130. In example embodiments, the memory profiles may be continuously updated with new data as new memory use reports are received from various user devices 110.

The leak detection system 130 may be further configured to use memory profiles generated from the periodically received memory use reports to identify if any of the processes exhibit characteristics that are consistent with that processes creating memory leaks. The leak detection system may 130, in example embodiments, be configured to perform various mathematical and/or statistical analysis on memory use over time data, available as various memory profiles associated with a particular processes, memory types, and/or user devices, to determine if any of the process across any of the user devices 110 are likely generating memory leaks on their respective user device 110. This statistical analysis may include various types of comparisons to characteristic that may be present in a memory use profile of a process that is leaky with respect to memory. Statistical tools and/or methods may be used to perform these comparisons, such as regression analysis, student's t-test, chi-square test, Wilcoxon test, calculating cross-correlations, applying averaging functions, filtering, or the like.

In some example embodiments, the leak detection system 130 may be configured to filter a memory profile associated with a particular process. This filtering may be to clean fast transients from the memory profile data. The filtering process may use any suitable mechanism, including, for example, sliding window averaging of the data, linear averaging of the data, exponential averaging of the data, thresholded-delta filtering, combinations thereof, or the like. In other example embodiments, the leak detection system may not engage in a filtering process prior to analysis for identifying characteristics associated with a memory leak in the available memory profiles.

After the optional filtering process, the memory profile data may be analyzed to detect any signatures of a memory leak. In some example embodiments, only a selected number of memory profiles associated with a particular process and user device 110 may be analyzed. It may be determined that some types of memory profiles (e.g., Vss Dalvik memory profile) may be more likely to exhibit characteristics of a memory leak than other types of memory profiles (e.g., Rss shared memory profile). In the interest of more effectively deploying processing bandwidth, in example embodiments, only the memory profiles that are relatively most likely yield indications of a memory leak may be analyzed for the same by the leak detection system 130.

To identify if a particular memory profile indicates characteristics of a memory leak, the leak detection system 130 may be configured to compare memory profiles being analyzed to memory profile templates, particularly memory profile templates that may be indicative of a memory leak. Mathematical methods, such as cross-correlations and other techniques may be used to compare the available memory profiles to memory profile templates for the purposes of identifying a memory leak. In some other example embodiments, the leak detection system 130 may determine if there is a monotonic increase in the data allocated to a particular process, as indicated by one or more filtered memory profiles associated with that process. Such a monotonic increase over a relatively extended period of time may be indicative of a memory leak associated with that process. The some further example embodiments, the leak detection system 130 may determine if there is a linear monotonic increase in the memory allocated to a particular process, as indicated by one or more filtered memory profiles associated with that process. A linear monotonic increase in the memory allocated to a particular process over a relatively extended period of time may be indicative of a memory leak associated with that process.

The leak detection system 130, upon identifying a memory leak from a particular process on a particular user device 110, may further be configured to receive a memory heap dump 140 from the user device 110 on which the process exhibiting symptoms of a memory leak is being executed. The memory heap dump 140 may pertain to the process for which a memory leak is detected or suspected. The leak detection system 130, in example embodiments, may solicit the heap dump 140 from a particular user device 110 on which a potential memory leak is detected. Therefore, the leak detection system 130 may generate a request for the memory heap dump 140 and may identify the process, such as by process identifier (pid), for the process for which the memory heap dump 140 is desired.

In example embodiments, the leak detection system 130 may still further be configured to generate a memory leak report 150 indicating a memory leak associated with a particular process and/or application. This memory leak report 150, in example embodiments, may include an identifier of the process (e.g., pid) and/or application from which the memory leak was detected. The memory leak report 150 may, in some example embodiments, further include information indicating the approximate rate of the memory leak detected, such as 10 Kb/day. The memory leak report, in other example embodiments, may have the memory heap dump 140 and/or select information from the memory heap dump 140 included therein. In accordance with example embodiments of the disclosure, the memory leak report 150 may be in a standard format, such as a format that may be used for the purposes of reporting software bugs and/or other application related issues. For example, the leak detection system 130 may be configured to generate a JIRA® file for the purposes of reporting the detected memory leak to a software developer.

Figure 2:
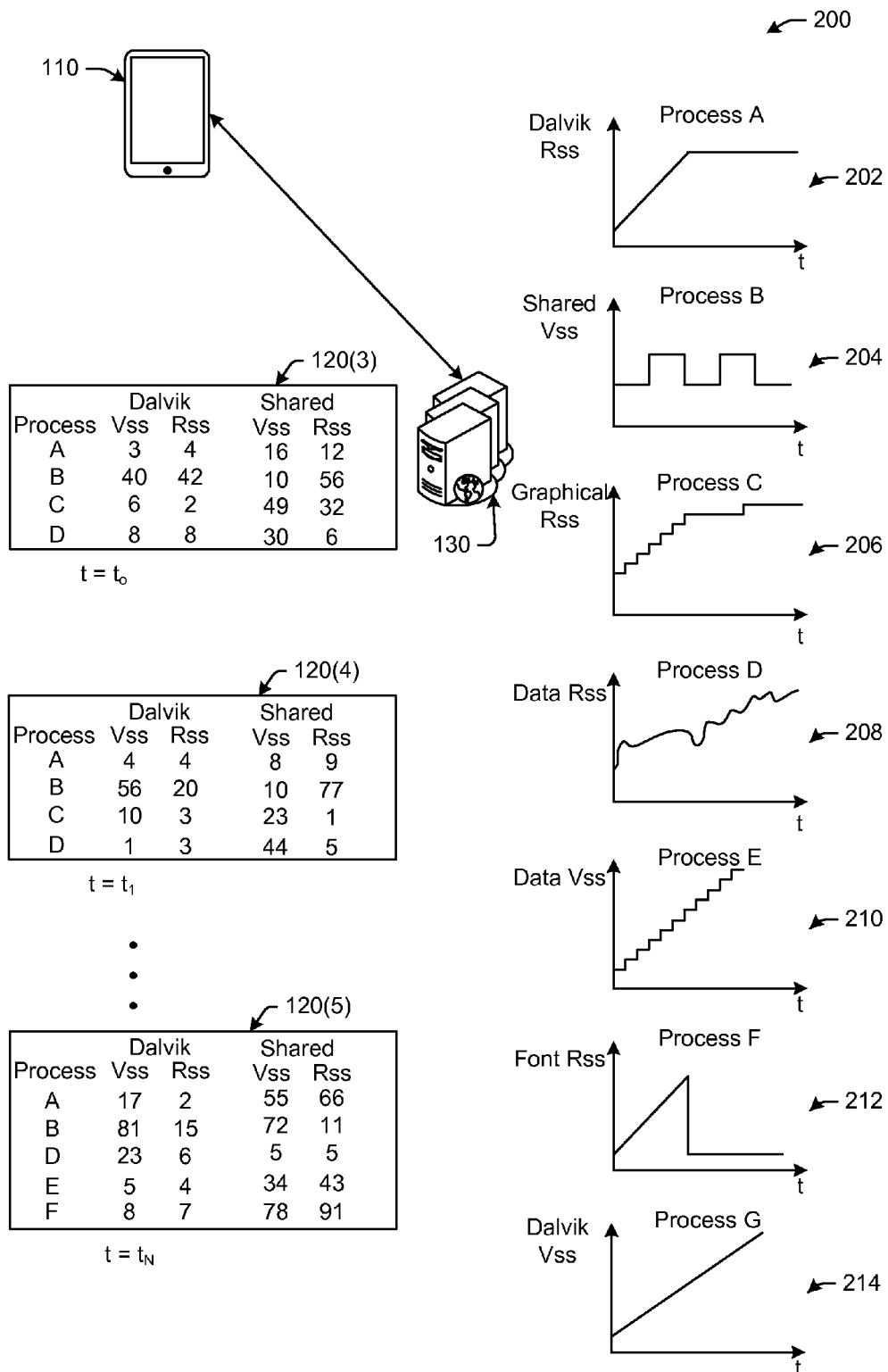
FIG. 2 is a schematic diagram that illustrates the example environment with the leak detection system of FIG. 1 receiving a time series of memory use reports to generate memory profile(s) associated with one or more processes operating on the user device, in accordance with example embodiments of the disclosure.

FIG. 2 is a schematic diagram that illustrates the example environment 200 with the leak detection system 130 of FIG. 1 receiving a time series of memory use reports 120 to generate memory use profiles(s) associated with one or more processes operating on the user device 110, in accordance with example embodiments of the disclosure. As shown here, the memory reports 120 may have a greater level of granularity than what was depicted with the memory use reports 120 of FIG. 1.

A particular user device 110 may generate a time series of memory use reports 120(3), 120(4), 120(5). In this example, memory use report 120(3) may be at a time $t_0$ and may precede the generation of memory use repot 120(4) at time $t_1$, which in turn may precede the generation of memory use report 120(5) at time $t_N$. Each of these memory use reports 120 may be generated by the user device 110 in a repeated fashion. In some example embodiments, the memory use reports may be generated in a periodic fashion (e.g., fixed time period between each memory use report). In other example embodiments, the memory use reports 120 may be generated with a variable periodicity. In still other example embodiments, the user device 110 may generate memory use reports 120 only when solicited to do so, such as by the leak detection system 130.

The memory use report 120 may provide a relatively high level of granularity in indicating how and what type of memory is allocated to particular processes on the user device 110. For example, as depicted, memory allocations to Dalvik Vss, Dalvik Rss, Shared Vss, and Shared Rss is shown in each of the memory use reports 120 for each of the processes operating one the user device 110. It will be appreciated that while four different categories of memory allocation are depicted here for illustrative purposes, there may be any suitable number of memory categories and allocations associated therewith provided on a memory use report 120. For example, for a particular process (e.g., as referenced by process identifier (pid)), the memory use report 120 may provide an indication of the allocated and/or mapped memory for that process as virtual set size (Vss) (e.g., allocated memory size) and/or resident set size (Rss) (e.g., mapped memory size). Furthermore, an indication of the type of allocation may also be provided, such as anonymous memory allocation, graphical memory allocation, shared memory allocation, single memory allocation, true type front memory allocation, data heap, Dalvik heap (e.g., virtual machine of Android® operating system), or the like. Any variety of memory and/or virtual memory allocation (VMA) tracer application (e.g., Plumber on FireOS® systems) may be used to identify the memory that is allocated to any variety of processes on the user device 110. In example embodiments, the mapped and/or allocated memory of a particular process, as indicated in particular memory use report, may by bytes (e.g., kilobytes, megabytes, etc.) of memory, blocks of memory, pages of memory, or any other suitable measure of memory size.

This type of process level memory allocations, as provided in the memory use reports 120, may further be utilized by the leak detection system 130 memory profiles associated with particular processes and memory types for the user device 110. For example, the leak detection system using the information in the memory use reports 120(3), 120(4), 120(5) may be configured to generate at least a Dalvik Vss, Dalvik Rss, a shared Vss, and a shared Rss memory profiles for each of processes "A," "B," "C," and "D." Not all of the memory profiles for a particular process may be equally useful for the purposes of detecting a memory leak associated with a process. As a non-limiting example, the Dalvik Vss memory profile may be more indicative of showing characteristics of a memory leak than, for example, a shared Rss memory profile.

The leak detection system 130 may, therefore, be configured to analyze all or a subset of the memory profiles associated with a particular process for the purposes of detecting a memory leak. The leak detection system 130 may, in example embodiments, be configured to only generate a variety of memory profiles, as graphically depicted 202, 204, 206, 208, 210, 212, 214. In example embodiments, after the leak detection system generates one or more memory profiles 202, 204, 206, 208, 210, 212, 214, the leak detection system 130 may analyze all or some of those memory profiles 202, 204, 206, 208, 210, 212, 214.

In some example embodiments, the leak detection system 130, as discussed above, may perform any variety of filtering one the memory profile data to clean up that data for improved reliability during analysis. In other example embodiments, the leak detection system 130 may not preprocess the memory profile data at all prior to analysis for leak detection. In some cases, the leak detection system 130 may compare and/or contrast the memory profiles 202, 204, 206, 208, 210, 212, 214 against any variety of memory profile templates, such as templates that are indicative of a memory leak and/or templates that are not indicative of memory leaks. In other example embodiments, the leak detection system 130 may be configured to search for one or more characteristics of a leaky process in the available memory profiles 202, 204, 206, 208, 210, 212, 214. Such characteristics may include, for example, a monotonic increase (e.g., a linear increase) in the memory allocation over time for a particular memory profile 202, 204, 206, 208, 210, 212, 214. In example embodiments, memory profiles 206, 208, 210, 214, or those that resemble the aforementioned memory profiles, may be indicative of a leaky process. In example embodiments, memory profiles 202, 204, 212, or those that resemble the aforementioned memory profiles, may be indicative of a normal non-leaky process.

Illustrative Architecture

Figure 3:
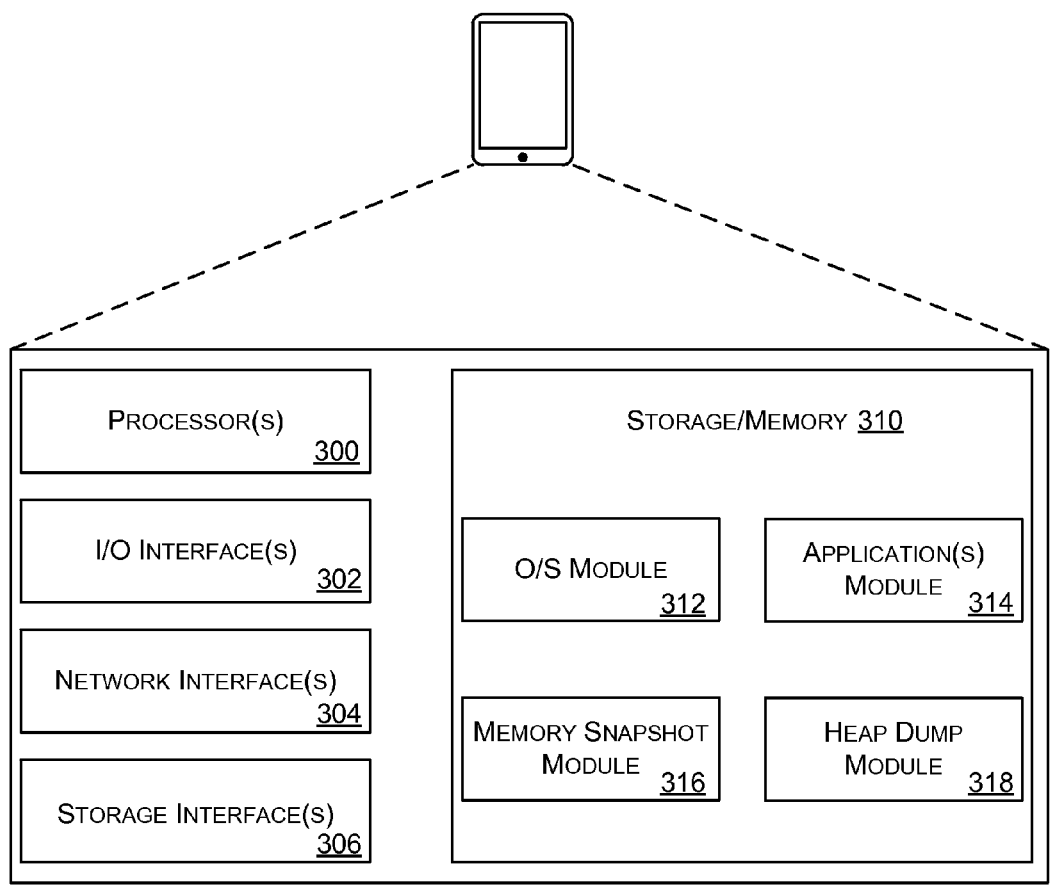
FIG. 3 is a block diagram that illustrates an example user device of FIGS. 1 and 2 to transmit memory reports and/or heap dumps, in accordance with example embodiments of the disclosure.

FIG. 3 is a block diagram that illustrates an example user device 110 of FIGS. 1 and 2 to transmit memory reports 120 and/or heap dumps 140, in accordance with example embodiments of the disclosure. The user device 110 may include one or more processor(s) 300, one or more input/output (I/O) interface(s) 302, one or more network interface(s) 304, one or more storage interface(s) 306, and one or more storage or memories 310.

In some examples, the processor(s) 300 of the user device 110 may be implemented as appropriate in hardware, software, firmware, or combinations thereof. Software or firmware implementations of the processors 300 may include computer-executable or machine-executable instructions written in any suitable programming language to perform the various functions described. Hardware implementations of the processors 300 may be configured to execute computer-executable or machine-executable instructions to perform the various functions described. The one or more processor(s) 300 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 110 may also include a chipset (not shown) for controlling communications between the one or more processor(s) 300 and one or more of the other components of the user device 110. The one or more processor(s) 300 may also include one or more application specific integrated circuits (ASICs) or application specific standard products (ASSPs) for handling specific data processing functions or tasks.

The I/O interface(s) 302 may enable the user device 110 to receive and/or provide input and/or output from/to one or more user interface(s). Some example user interface(s) may include touch sensitive screens, buttons, switches, microphones, speakers, haptic devices/vibrators, mice, keyboards, combinations thereof, or the like. The user interface(s) may be configured to interact with the processor(s) 300 enabled by the I/O interface(s) 302 of the user device 110. The network interfaces(s) 304 may allow the advertisement user devices 110 to communicate via one or more network(s) and/or via any other suitable communicative links. The storage interface(s) 306 may enable the user device 110 and the processor(s) 300 thereon to access, read, and write to the storage/memory 310 and/or other external storage devices and/or databases. In some example embodiments, the storage interface(s) 306 may include a memory management unit (MMU) for managing memory use and/or allocation to one or more applications running on the user device 110.

The storage/memory 310 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The storage/memory 310 may store program instructions that are loadable and executable on the processor(s) 300, as well as data generated or received during the execution of these programs. Turning to the contents of the storage/memory 310 in more detail, the storage/memory 310 may include one or more operating systems (O/S) 312, an application(s) module 314, a memory snapshot module 316, and a heap dump module 318. Each of the modules and/or software may provide functionality for the user device 110, when executed by the processor(s) 300. The modules and/or the software may or may not correspond to physical locations and/or addresses in storage/memory 310. In other words, the contents of each of the modules 312, 314, 316, 318 may not be segregated from each other and may, in fact be stored in at least partially interleaved positions on the storage/memory 310.

The O/S module 312 may have one or more operating systems stored thereon. The processor(s) 300 may be configured to access and execute one or more operating systems stored in the (O/S) module 312 to operate the system functions of the user device 110. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like. There may also be a variety of enabling applications that may be stored in the memory/storage 310 that may enable a variety of functions and processes that may be used in conjunction with the processes and/or modules described herein. These applications may include, but are not limited to, functionality such as web browsing, business, communications, graphics, word processing, publishing, spreadsheets, databases, gaming, education, entertainment, media, project planning, engineering, drawing, or combinations thereof.

The application module 314 may contain instructions and/or applications thereon that may be executed by the processor(s) 300 to provide one or more services to a user of the user device 110. These instructions and/or applications may, in certain aspects, interact with the operating system module 312 and/or other modules of the user device 110. The applications module 314 may include instructions and/or applications therein that when executed by processor(s) 300 enable the user device 110 to perform a variety of functions that may be desired by the user of the user device 110. These applications may enable the rendering of content on the user device 110, performing calculations, word processing, spread sheet, database functions, engineering functions, external device control, communications functionality, navigation functions, social networking, biometric monitoring, content generation, calculations, or any other suitable functions. The applications and certain embodiments may control one or more input/output devices such as touch panels, displays, microphones, sensors or speakers of the user device 110.

In example embodiments, the application(s) associated with the application(s) module 314 may launch one or more processes on the user device 110. In other words, the functionality that may be provided by a particular application operating on a user device 110 may be provided by one or more particular processes associated with that application that may be operating on the user device 110. For example, a particular application software may spawn "process A," "process B," and "process C," all of which may be executed by the processor(s) 300 to provide, to the user, the functionality associated with the application software. These processes may be any suitable process, written in any suitable programming language, such as a Java process. In some cases, one or more processes associated with an application, as stored in the application(s) module 314, may be leaky. When this happens, the memory leaks may block segments of the memory 310 from being used for productive purposes, such as executing instructions and/or storing application data, and/or segment the memory 310, resulting in diminished system performance.

The memory snapshot module 316 may contain instructions and/or applications thereon that may be executed by the processor(s) 300 to provide one or more services associated with providing a memory use report 120. The processor(s) 300, in the memory use reports 120, may include a listing of processes that have memory allocated to them at the time when the memory use report is generated. The memory use reports 120 may include a listing of all the processes that may be using memory or have memory allocated to them on the user device 110 with an indication of the corresponding level of memory usage/allocation by/to that process. The processes, as listed in each of the memory use reports 120, may be listed by its process identifier (pid) or any other suitable identifier. Therefore, by using the memory use reports 120, one can identify which processes are running or are at least using/allocating memory 310 resources on a user devices 110.

In accordance with some example embodiments of the disclosure, processor(s) 300 may be configured to generate the memory use report 120 when solicited to do so by any suitable entity, such as the leak detection system 130. In other example embodiments, instructions being executed on the user device 110 may periodically generate and transmit the memory use report 120 according to a predetermined frequency. The periodicity of generating the memory use report may be set by the user device 110, by the leak detection system 130, by software settings that are set by the manufacturer of the user device 110, a user of the user device 110, or any other suitable entity.

In example embodiments, the memory use report 120, as generated by the processor(s) 300, may provide a relatively high level of granularity with respect to indicating the use and/or allocation of memory by category for each process on the memory use report 120. For example, for a particular process the memory use report 120 may provide an indication of the allocated and/or mapped memory for that process as virtual set size (Vss) (e.g., allocated memory size) and/or resident set size (Rss) (e.g., mapped memory size). Furthermore, an indication of the type of allocation may also be provided, such as anonymous memory allocation, graphical memory allocation, shared memory allocation, single memory allocation, true type front memory allocation, data heap, Dalvik heap (e.g., virtual machine of Android® operating system), or the like.

The processor(s) 300 by executing the instructions stored in the memory snapshot module 316 may further be configured to access one or more repositories of information on the allocation of memory by the processor(s) 300 of the user device 110. In some example embodiments, the processor(s) 300 may include a memory management unit (MMU). This MMU may maintain a repository or listing of how much and what type of memory is being used or has otherwise been allocated to process(es) being executed by the processor(s)

300, such as process(es) related to the applications stored in the applications module 314. In example embodiments, the processor(s) 300 may query the MMU to identify the memory allocations by memory type to each of the processes. The amount (page, block, Kbits, etc.) of allocated memory size and mapped memory size may be received for each process and memory type (e.g., Dalvik, shared, graphical, true-type, etc.) from the MMU. In example embodiments, the MMU may be configured to maintain a page table that tracks memory allocated by type to each of the various processes operating on the user device 110. Alternatively, the processor(s) 300 by executing the instructions stored in the memory snapshot module 316 may be configured to query the O/S 312 for information pertaining to the amount of allocated memory size and mapped memory size may be received for each process and memory type (e.g., Dalvik, shared, graphical, true-type, etc.). When a particular process running on the user device requests a memory allocation, a system call may be made for the allocation of that memory via the O/S 312. In this case, the O/S may track, such as on a list, the memory that is being allocated and released, such as by type, to each of the processes operating on the processor(s) 300. Upon soliciting this information, the processor(s) 300 may be configured to receive process level memory allocation/use information from the O/S.

The instructions and/or functionality stored in the heap dump module 318 may be executed by the processor(s) 300 to provide a variety of functionality to the user device 110 pertaining to generating a heap dump 140 of the memory 310 associated with a particular process of the user device 110. In example embodiments, the processor(s) 300 may be configured to generate a memory heap dump 140 upon receiving a request to do so, such as by a request from the leak detection system 130. The memory heap dump 140 may be associated with a particular process, such as a process that may be resulting in memory leaks on the user device 110. In example embodiments, the heap dump request from the leak detection system 130 may instruct to generate and send a heap dump 140 of a particular process that may have been identified by the leak detection system 130 as causing memory leaks. The memory heap dump 140 may include information with greater granularity than the memory use reports 120 about how memory for a particular process is allocated. For example, the memory heap dump may include memory allocations to individual objects (e.g., objects, classes, fields, primitive values, references, stacks, variables, etc.). The memory heap dump 140 information may be used by a software developer to determine what objects associated with the process are present and analyze the same to better pinpoint what functions or objected of the process may be causing memory leaks.

It will be appreciated that there may be overlap in the functionality of the instructions stored in the one or more operating systems (O/S) module 312, the application(s) module 314, the memory snapshot module 316, and the heap dump module 318. In fact, the functions of the aforementioned modules 312, 314, 316, 318 may interact and cooperate seamlessly under the framework of the user device 110. Indeed, each of the functions described for any of the modules 312, 314, 316, 318 may be stored in any module 312, 314, 316, 318 in accordance with certain example embodiments of the disclosure. Further, in certain example embodiments, there may be one single module that includes the instructions, programs, and/or applications described within the operating systems (O/S) module 312, the application(s) module 314, the memory snapshot module 316, and the heap dump module 318.

Figure 4:
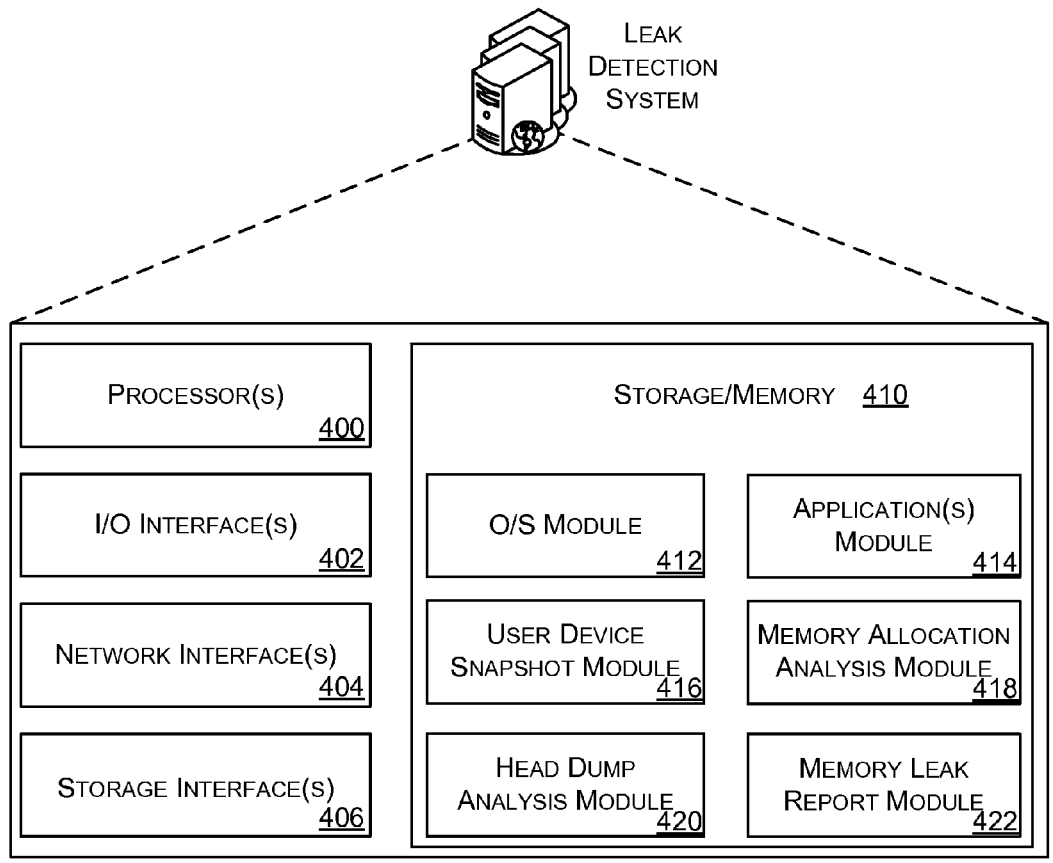
FIG. 4 is a block diagram illustrating an example leak detection system of FIGS. 1 and 2 for detecting memory leaks associated with one or more processes operating one or more user devices, in accordance with example embodiments of the disclosure.

FIG. 4 is a block diagram illustrating an example leak detection system 130 of FIGS. 1 and 2 for detecting memory leaks associated with one or more processes operating one or more user devices 110, in accordance with example embodiments of the disclosure. The leak detection system 130 may include one or more one or more processor(s) 400, one or more input/output (I/O) interface(s) 402, one or more network interface(s) 404, one or more storage interface(s) 406, and one or more storage or memories 410.

The descriptions of the one or one or more processor(s) 400, the one or more input/output (I/O) interface(s) 402, the one or more network interface(s) 404, the one or more storage interface(s) 406, and the one or more storage or memories 410 may be substantially similar to the descriptions of the one or one or more processor(s) 300, one or more input/output (I/O) interface(s) 302, one or more network interface(s) 304, the one or more storage interface(s) 306 and one or more storage or memories 310 of the user device 110, as described in conjunction with FIG. 3, and in the interest of brevity, will not be repeated here.

The storage/memory 410 may store program instructions that are loadable and executable on the processor(s) 400, as well as data generated or received during the execution of these programs. Turning to the contents of the storage/memory 410 in more detail, the storage/memory 410 may include one or more operating systems (O/S) module 412, an applications module 414, a user device snapshot module 416, a memory allocation analysis module 418, and a heap dump module 420, and a memory leak report module 422. Each of the modules and/or software may provide functionality for the leak detection system 130, when executed by the processor(s) 400. The modules and/or the software may or may not correspond to physical locations and/or addresses in storage/memory 410. In other words, the contents of each of the modules 412, 414, 416, 418, 420, 422 may not be segregated from each other and may, in fact be stored in at least partially interleaved positions on the storage/memory 410.

The description of the O/S module 412 and application(s) module 414 may be substantially similar to the description of the O/S module 312 and the applications module 314, respectively, of the user device 110, as described in conjunction with FIG. 3, and in the interest of brevity, will not be repeated here.

The processor(s) 400, by executing instructions stored in the user device snapshot module 416, may be configured to interact with a user device 110 to receive one or more memory use reports 120. In example embodiments, the processor(s) 400 may be configured to receive a memory use report 120 from a particular user device 110 on a periodic basis. For example, the processor(s) 400 may be configured to receive a memory use report 120 every 4 hours from a particular user device 110. As another example, the processor(s) 400 may be configured to receive a memory use report every 2 minutes from the particular user device 110. In example embodiments of the disclosure, the processor(s) 400 may solicit the memory use reports from the user devices 110. In these example embodiments, the processor(s) 400 may be configured to generate a request for a memory use report 120 from a particular user device 110 and send the same to that particular user device 110. In response to the request, the processor(s) 400 may be configured to receive a memory use report 120 from the particular user device 110. The processor(s) 400 may be configured to organize and store the memory use reports 120 that may be received from the various user devices 110 over time, such as in storage/memory 410. As discussed above, the memory use report 120, as received by the processor(s) 400, may have a relatively high level of granularity with regards to indicating the type and category of memory allocated to a particular process. For example, the memory report 120 may indicate the Vss and Rss for various category or bins of memory, such as anonymous memory allocation, graphical memory allocation, shared memory allocation, single memory allocation, true type front memory allocation, data heap, Dalvik heap, or the like, for the particular process.

The processor(s) 400, as disclosed herein, may be configured to receive a time series of memory use reports 120 from a particular user device 110 and generate memory profiles (e.g., data sets of memory use over time associated with each process running on the user device). The processor(s) 400 may be able to generate such memory profiles with type/bin granularity provided in the received memory use reports. For example, the processor(s) 400 may be configured to generate a memory profile as a time series of Dalvik allocated memory (e.g., Vss) associated with a particular process. As another example, the processor(s) 400 may be configured to generate memory profiles as any one or more of time series of Vss graphical memory, Rss graphical memory, Vss anonymous memory, Rss anonymous memory, Vss shared memory, Rss shared memory, Vss true-type font memory, Rss true-type font memory, Rss code memory, Vss code memory, Rss device mapping memory, Vss device mapping memory, Vss virtual machine memory, Rss virtual machine memory, Vss data memory, Rss data memory, combinations thereof, or the like. It will be appreciated that the processor(s) 400 may be configured to use a relatively high level of granularity of memory use data with regards to type/bin allocated and/or used memory.

The processor(s) 400, by executing instructions stored in the memory allocation analysis module 418, may be configured to use the one or more received memory use reports from a user device to generate one or more memory profiles. The analysis may include various types of statistical analysis to determine if a memory profile of a particular process matches a profile that is expected when a memory leak occurs. The processor(s) 400 may be configured to use memory profiles generated from the periodically received memory use reports 120 to identify if any of the processes exhibit characteristics that are consistent with that processes creating memory leaks. The processor(s) 400, in example embodiments, may be configured to perform various mathematical and/or statistical analysis on memory use over time data, available as various memory profiles associated with a particular processes, memory types, and/or user devices 110, to determine if any of the process across any of the user devices 110 are likely generating memory leaks on their respective user device 110. This statistical analysis may include various types of comparisons to characteristic that may be present in a memory use profile of a process that is leaky with respect to memory. Statistical tools and/or methods may be used to perform these comparisons, such as regression analysis, student's t-test, chi-square test, Wilcoxon test, calculating cross-correlations, applying averaging functions, filtering, or the like.

In some example embodiments, the processor(s) 400 may be configured to filter a memory profile associated with a particular process. This filtering may be to clean fast transients and noise from the memory profile data. The filtering process may use any suitable mechanism, including, for example, sliding window averaging of the data, linear averaging of the data, exponential averaging of the data, thresholded-delta filtering, combinations thereof, or the like. In other example embodiments, the processor(s) 400 may not engage in a filtering process prior to analysis for identifying characteristics associated with a memory leak in the available memory profiles.

The processor(s) 400, in some example embodiments after a filtering process, may be configured to analyze the memory profile data to detect any signatures of a memory leak. In some example embodiments, only a selected number of memory profiles associated with a particular process and user device 110 may be analyzed. It may be determined that some types of memory profiles (e.g., Vss Dalvik memory profile) may be more likely to exhibit characteristics of a memory leak than other types of memory profiles (e.g., Rss shared memory profile). In the interest of more effectively deploying processing bandwidth of the processor(s) 400, in example embodiments, only the memory profiles that are relatively most likely yield indications of a memory leak may be analyzed for the same by the processor(s) 400.

To identify if a particular memory profile indicates characteristics of a memory leak, the leak processor(s) 400 may be configured to compare memory profiles being analyzed to memory profile templates, particularly memory profile templates that may be indicative of a memory leak. Mathematical methods, such as cross-correlations and other techniques may be used to compare the available memory profiles to memory profile templates for the purposes of identifying a memory leak. In some other example embodiments, the processor(s) 400 may determine if there is a monotonic increase in the data allocated to a particular process, as indicated by one or more filtered memory profiles associated with that process. Such a monotonic increase over a relatively extended period of time may be indicative of a memory leak associated with that process. The some further example embodiments, the processor(s) 400 may be configured to determine if there is a linear monotonic increase in the memory allocated to a particular process, as indicated by one or more filtered memory profiles associated with that process. A linear monotonic increase in the memory allocated to a particular process over a relatively extended period of time may be indicative of a memory leak associated with that process.

In some cases, when a process is initially launched on the user device, there may be a burst of memory allocation activity. This memory allocation may be transient in nature and may level out or achieve a steady state level after the initial burst of memory allocation activity. The processor(s) 400 may be configured to not err by indicating a false positive based on memory allocation activity during the initial burst of activity when a process is launched. In example embodiments, the processor(s) 400 may be configured to identify that the initial burst of memory allocation activity is indeed transient and does not last for an extended time period that would be indicative of a memory leak. The processor(s) 400 may further identify that the initial burst of activity may indicate an exponential increase, rather than linear increase, in the allocation of memory to a particular process (e.g., for a particular memory allocation type and bin). Such an exponential increase in the allocation of memory may be indicative of a process start up rather than a slow memory leak from a process.

The processor(s) 400, by executing instructions stored in the heap dump analysis module 420, may be configured to receive a heap dump generated by a user device 110. The processor(s) 400 upon detecting a memory leak associate with a particular process may be configured to receive a memory heap dump 140 from the user device 110 on which the process exhibiting symptoms of a memory leak is being executed. The memory heap dump 140 may pertain to the process for which a memory leak is detected or suspected. The processor(s) 400, in example embodiments, may be configured to solicit the heap dump 140 from a particular user device 110 on which a potential memory leak is detected. In this case, the processor(s) 400 may be configured to generate a request for the memory heap dump and may identify the process, such as by process identifier (pid), for the process for which the memory heap dump is desired. The memory heap dump, in example embodiments, may include a variety of information associated with the process at a relatively finer granularity than what may be provided in a memory use report from the user device. The memory heap dump may show objects, classes, stacks, variables, and the like that may be using memory and associated with a particular process. In some example embodiments, the processor(s) 400 may be configured to extract pertinent information associated with a leaky process from the heap dump 140.

The processor(s) 400, by executing instructions stored in the memory leak report module 422, may be configured to generate a report indicating that a memory leak may occur when a particular process and/or application is operated. In example embodiments, the processor(s) 400 may be configured to generate a report indicating a memory leak associated with a particular process and/or application. This memory leak report may include an identifier of the process and or application from which the memory leak was detected. The memory leak report may, in some example embodiments, further include information indicating the approximate rate of the memory leak detected, such as 100 Kb per week. The memory leak report, in other example embodiments, may have the memory heap dump and/or select information from the memory heap dump included therein. In accordance with example embodiments of the disclosure, the memory leak report may be in a standard format, such as a format that may be used for the purposes of reporting software bugs and/or other application related issues. For example, the processor(s) 400 may be configured to generate a JIRA® file for the purposes of reporting the detected memory leak to a software developer.

It will be appreciated that there may be overlap in the functionality of the instructions stored in the one or more operating systems (O/S) module 412, the application(s) module 414, the user device snapshot module 416, the memory allocation analysis module 418, the heap dump analysis module 420, and the memory leak report module 422. In fact, the functions of the aforementioned modules 412, 414, 416, 418, 420, 422 may interact and cooperate seamlessly under the framework of the leak detection system 130. Indeed, each of the functions described for any of the modules 412, 414, 416, 418, 420, 422 may be stored in any module 412, 414, 416, 418, 420, 422 in accordance with certain example embodiments of the disclosure. Further, in certain example embodiments, there may be one single module that includes the instructions, programs, and/or applications described within the operating systems (O/S) module 512, the application(s) module 414, the user device snapshot module 416, the memory allocation analysis module 418, the heap dump analysis module 420, and the memory leak report module 422.

Illustrative Processes

Figure 5:
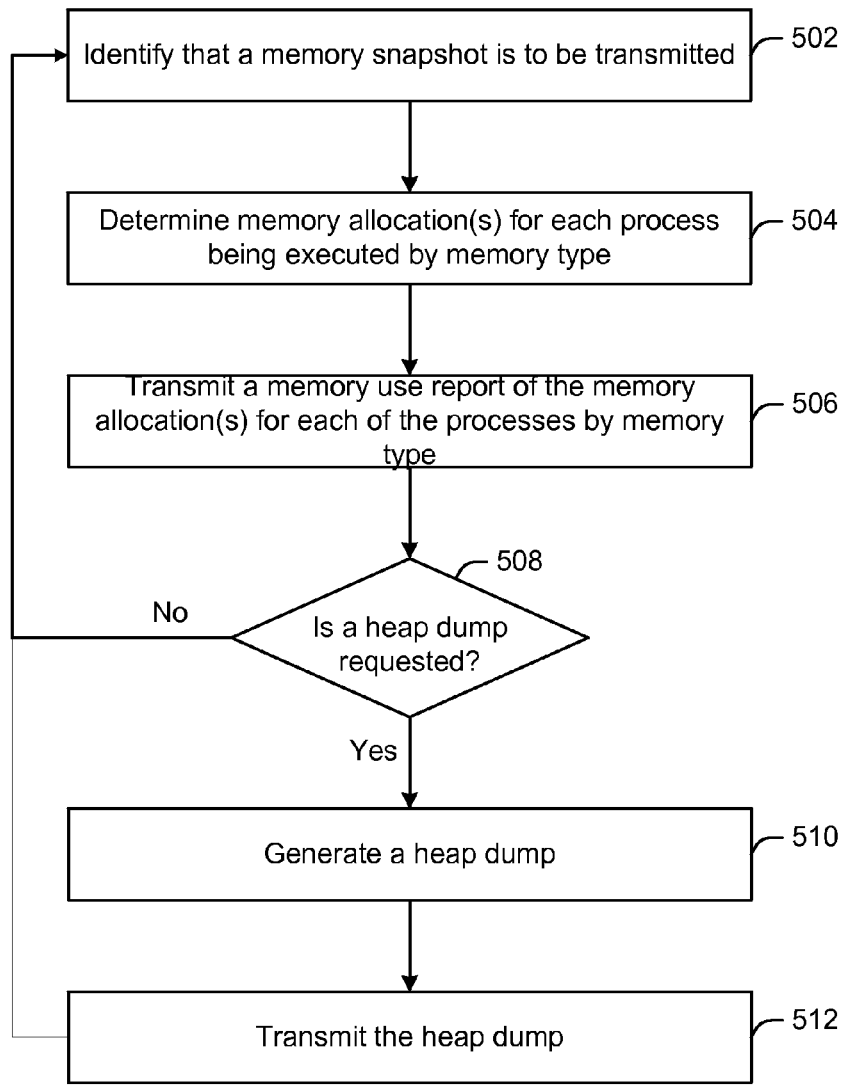
FIG. 5 is a flow diagram illustrating an example method for providing one or more memory use reports and/or heap dump by an example user device of FIG. 3, in accordance with example embodiments of the disclosure.

FIG. 5 is a flow diagram illustrating an example method for providing one or more memory use reports and/or heap dump by an example user device of FIG. 3, in accordance with example embodiments of the disclosure. The method 500 may be performed by the user device 110 and the processor(s) 300 thereon in cooperation with one or more other elements of environment 100.

At block 502, it may be identified that a memory snapshot is to be transmitted. In example embodiments, that this action is to be taken may be triggered by a timer, such as an application running on the user device 110 that indicates that a memory use report is to be generated and transmitted to the leak detection server 130. Alternatively, the user device 110 may identify that a memory use report is to be generated by receiving a request, such as from the leak detection system 130, for the memory use report.

At block 504, memory allocation(s) for each processes executed on the user device by memory type may be determined. In example embodiments, the memory use report 120 may provide a relatively high level of granularity with respect to indicating the use and/or allocation of memory by category for each process on the memory use report 120. For example, for a particular process the memory use report 120 may provide an indication of the allocated and/or mapped memory for that process as virtual set size (Vss) (e.g., allocated memory size) and/or resident set size (Rss) (e.g., mapped memory size). Furthermore, an indication of the type of allocation may also be provided, such as anonymous memory allocation, graphical memory allocation, shared memory allocation, single memory allocation, true type front memory allocation, data heap, Dalvik heap (e.g., virtual machine of Android® operating system), or the like. At block 506, the memory use report of the memory allocation(s) by type for each of the processes may be transmitted. The memory use report 120 may be transmitted, in example embodiments, to the leak detection system 130, such as via any suitable communicative connections with the leak detection system 130.

The memory use by process running on the user device 110 and the processor(s) 300 thereon may be determined by querying the O/S 312 and/or a memory management unit (MMU), such as an MMU that may be part of the processor(s) 300. The amount (page, block, Kbits, etc.) of allocated memory size and mapped memory size may be received for each process and memory type (e.g., Dalvik, shared, graphical, true-type, etc.). The various types of memory allocation, for example, may be provided by a MMU that maintains a page table that tracks memory allocated by type to each of the various processes operating on the user device 110.

At block 508, it may be determined if a heap dump has been requested. If it is determined that a heap dump has not been requested, then the method 500 may return to block 502, where it may be identified that another memory snapshot is to be generated and transmitted. It should be noted that the memory snapshots may be generated on a periodic basis, such as by the mechanism of shown here. However, there may be a delay between subsequent memory snapshots and transmissions of the memory use report. As a non-limiting example, the memory use report may be transmitted daily or hourly or every other minute, for example. Indeed, it will be appreciated that the periodicity for generating and transmitting a memory user report by the user device 110 may be set to any suitable time period. Therefore, it should be appreciated that the method 500 may wait at block 502 until it is determined that another memory use report 120 is to be generated and transmitted to the leak detection system 130.

If at block 508 it was determined that a heap dump was requested, then, at block 510, a heap dump may be generated. The generation of the heap dump may be indicative of there being a memory leak detected by the leak detection system 130 with one or more processes operating one the user device 110. The memory heap dump 140 may include information with greater granularity than the memory use reports 120 about how memory for a particular process is allocated. For example, the memory heap dump 140 may include memory allocations to individual objects (e.g., objects, classes, fields, primitive values, references, stacks, variables, etc.). The memory heap dump 140 information may be used by a software developer to determine what objects associated with the process are present and analyze the same to better pinpoint what functions or objected of the process may be causing memory leaks. At block 512, the heap dump may be transmitted. The heap dump 140, in example embodiments, may be transmitted to the leak detection system 130. It will be appreciated that after the heap dump 140 is sent by the user device 110, the user device 110 may proceed to restarting the method at 502 to continue to provide memory use reports periodically to the leak detection system 130 for the purposes of detecting leaks associated with processes running on the user device 110.

It should be noted that the method 500 may be modified in various ways in accordance with certain embodiments. For example, one or more operations of the method 500 may be eliminated or executed out of order in other embodiments. Additionally, other operations may be added to the method 500 in accordance with other embodiments.

Figure 6:
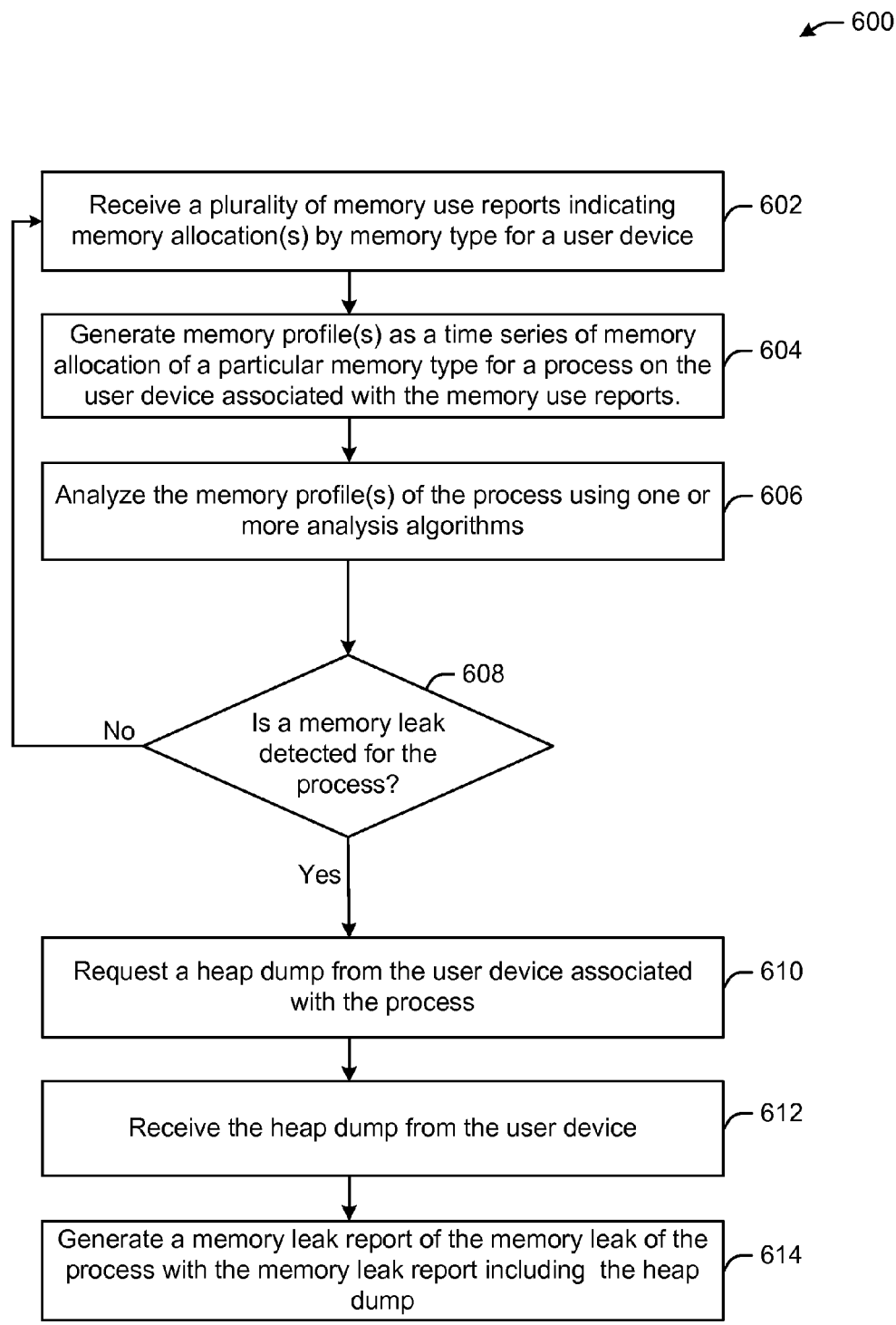
FIG. 6 is a flow diagram illustrating an example method for determining that a memory leak exists with a process and generating a report of the detected memory leak, in accordance with example embodiments of the disclosure.

FIG. 6 is a flow diagram illustrating an example method 600 for determining that a memory leak exists with a process and generating a report 150 of the detected memory leak, in accordance with example embodiments of the disclosure. The method 600 may be performed by the leak detection system 130 and the processor(s) 400 thereon in cooperation with one or more other elements of environment 100.

At block 602, a plurality of memory use reports indicating memory allocation(s) by memory type may be received from a user device. In example embodiments, a time series of memory use reports 120 from a particular user device 110 may be received. The periodicity or temporal spacing of the memory use reports 120, as received, may be suitable for identifying one or more memory leaks that may be occurring on the user device 110. Sufficient memory data may be received over time from a particular user device 110 to be able to generate a dataset of memory use over time associated with various processes operating on that particular user device 110.

At block 604, memory profile(s) as a time series of memory allocation of a particular process for the user device may be generated using the memory use reports. In fact, the leak detection system may be able to generate such a time series of memory data with a memory data type/bin granularity provided in the received memory use reports. For example, the leak detection system may be able to generate a time series of Dalvik allocated memory (e.g., Vss) associated with a particular process. As another example, the leak detection system may be able to generate any one or more of time series of Vss graphical memory, Rss graphical memory, Vss anonymous memory, Rss anonymous memory, Vss shared memory, Rss shared memory, Vss true-type font memory, Rss true-type font memory, Rss code memory, Vss code memory, Rss device mapping memory, Vss device mapping memory, Vss virtual machine memory, Rss virtual machine memory, Vss data memory, Rss data memory, combinations thereof, or the like. It will be appreciated that the memory use reports 120 may provide and the leak detection system may be configured to use a relatively high level of granularity of memory use data with regards to type/bin allocated and/or used memory.

At block 606, the memory profile(s) of the particular process may be analyzed using one or more analysis algorithms. The memory profile(s) may be analyzed to determine if any of them exhibit characteristics that are consistent with that process creating memory leaks. As discussed above, this process may first involve any variety of data smoothing and/or noise rejection. Any variety of suitable mathematical and/or statistical analysis may be performed on the memory profile(s) to determine if the process is likely generating memory leaks on the user device on which that process is running. This statistical analysis may include various types of comparisons to characteristic that may be present in a memory use profile of a process that is leaky with respect to memory. Statistical tools and/or methods may be used to perform these comparisons, such as regression analysis, student's t-test, chi-square test, Wilcoxon test, calculating cross-correlations, applying averaging functions, filtering, or the like.

In example embodiments, the memory profile(s) may be filtered to remove noise. The filtering process may use any suitable mechanism, including, for example, sliding window averaging of the data, linear averaging of the data, exponential averaging of the data, thresholded-delta filtering, combinations thereof, or the like. After the filtering process, the data may be analyzed to detect any signatures of a memory leak. In some example embodiments, it may be determined if there is a monotonic increase in the data allocated to a particular process, as indicated by one or more filtered memory profiles associated with that process. Such a monotonic increase over a relatively extended period of time may be indicative of a memory leak associated with that process. The some further example embodiments, the leak detection system may determine if there is a linear monotonic increase in the memory allocated to a particular process, as indicated by one or more filtered memory profiles associated with that process. A linear monotonic increase in the memory allocated to a particular process over a relatively extended period of time may be indicative of a memory leak associated with that process.

The leak detection system, in example embodiments, may generate a plurality of memory profiles (e.g., time series data of memory allocation of a particular type and category) associated with a particular process, such as by the processes of block 604. Not all of the memory profiles for a particular process may be equally useful for the purposes of detecting a memory leak associated with a process. The leak detection system may analyze all or a subset of the memory profiles associated with a particular process for the purposes of detecting a memory leak. The leak detection system may, in example embodiments, only generate and/or analyze memory profiles that are most likely to result in an accurate detection of memory leak. In other words, the leak detection system may not generate or analyze a memory profile (e.g., a particular time series memory type and bin allocation) if it is relatively less likely than other memory profiles associated with that process to indicate a memory leak. For example, the resident set size (Rss) of mapped shared objects associated with a particular process may be relatively less likely to exhibit indications of a memory leak resulting form that particular process compared to, for example the virtual set size (Vss) of the anonymous memory allocation. In this case, in certain non-limiting examples, the leak detection system may proceed with analyzing the Vss anonymous memory profile and not analyze the Rss mapped shared objects memory profile for the purposes of detecting a memory leak resulting from a process associated with both of the aforementioned memory profiles.

At block 608, It may be determined if a memory leak is detected for the particular process. If it is determined that a memory leak is not detected for the particular process, then the method 600 may return to block 602, where the leak detection system may continue to monitor the particular process, in addition to other processes that may be operating on the user device. As new memory use reports come in per the processes of block 602, the memory profile(s) of all of the processes being monitored for memory leaks may be updated and subjected to analysis according to the processes described in conjunction with blocks 604 and 606. If at block 608 it is determined that there is a memory leak detected for the particular process, then at block 610, a heap dump of the memory may be requested form the user device. In this case, the leak detection system may generate a request for the memory heap dump and may identify the process, such as by process identifier (pid), for the process for which the memory heap dump is desired.

At block 612, a heap dump may be received from the user device. The memory heap dump 140 may be received from the user device on which the process exhibiting symptoms of a memory leak is being executed. The memory heap dump 140 may pertain to the process for which a memory leak is detected or suspected. The memory heap dump 140, in example embodiments, may include a variety of information associated with the process at a relatively finer granularity than what may be provided in a memory use report from the user device. The memory heap dump may show objects, classes, stacks, variables, and the like that may be using memory and associated with a particular process. This information may be used to recreate the situation under which a memory leak may occur with that process in an effort to repair any source code of that process to prevent the detected memory leaks.

At block 614, a report of the memory leak of the particular process may be generated by including the heap dump. The memory leak report may indicate a memory leak associated with a particular process and/or application. This memory leak report may include an identifier of the process and or application from which the memory leak was detected. The memory leak report may, in some example embodiments, further include information indicating the approximate rate of the memory leak detected, such as 1 Kb/hour. The memory leak report, in other example embodiments, may have the memory heap dump and/or select information from the memory heap dump included therein. In accordance with example embodiments of the disclosure, the memory leak report may be in a standard format, such as a format that may be used for the purposes of reporting software bugs and/or other application related issues. For example, the leak detection system may be configured to generate a JIRA® file for the purposes of reporting the detected memory leak to a software developer.

It should be noted that the method 600 may be modified in various ways in accordance with certain embodiments. For example, one or more operations of the method 600 may be eliminated or executed out of order in other embodiments. Additionally, other operations may be added to the method 600 in accordance with other embodiments.

Embodiments may be provided as a computer program product including one or more non-transitory machine-readable storage media having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, the distribution of software may be an Internet download.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed:

1. A leak detection system, comprising:
   at least one memory that stores computer-executable instructions; and
   at least one processor that accesses the at least one memory and is operationally coupled to a transceiver, wherein the at least one processor is configured to:
      receive a plurality of memory use reports from a user device, including a first memory use report and a second memory use report, wherein the first memory use report indicates a first amount of memory of a first process at a first time and a third amount of memory for a second process at the first time and the second memory use report indicates a second amount of memory of the first process at a second time and a fourth amount of memory for the second process at the second time, wherein the processes comprise a set of instructions associated with one or more applications being executed on the user device;
      determine a first memory profile using the first memory use report and using the second memory use report, wherein the first memory profile comprises a time progression of memory associated with the first process and the user device;
      determine a first filtered memory profile by applying a linear sliding average to the first memory profile;
      determine a second memory profile using the first memory use report and the second memory use report, wherein the second memory profile comprises a time progression of memory associated with the second process and the user device;
      determine a second filtered memory profile by applying a linear sliding average to the second memory profile;

analyze the first filtered memory profile by searching the first filtered memory profile for one or more memory characteristics indicative of a memory leak;

analyze the second filtered memory profile by searching the second filtered memory profile for one or more memory characteristics indicative of a memory leak;

determine that the first filtered memory profile indicates that the first process generated a memory leak on the user device and that the second filtered memory profile indicates that the second process did not generate a memory leak on the user device;

generate a memory leak report that indicates that the first process generates memory leaks on the user device and that the second process does not generate memory leaks on the user device; and send the memory leak report.

2. The leak detection system of claim 1, wherein the first memory use report further includes an indication of the third amount of memory of the second process at the first time, wherein the second memory use report further includes an indication of the fourth amount of memory for the second process at the second time, and wherein the at least one processor is further configured to determine that the third amount and the fourth amount are not to be used for identifying the memory leak on the user device.

3. The leak detection system of claim 1, wherein the at least one processor is configured to analyze the filtered memory profiles by determining that the first filtered memory profile exhibits a linear monotonic increase in memory over time.

4. The leak detection system of claim 1, wherein the at least one processor is further configured to:

request, from the user device at a third time, a memory heap dump associated with the first process, wherein the memory heap dump associated with the first process indicates memory used by one or more objects associated with the first process at substantially the third time, wherein the first process is a Java process; and receive, from the user device, the memory heap dump associated with the first process.

5. A method, comprising:

receiving, by a leak detection system comprising one or more processors, a first memory use report and a second memory use report associated with a user device, wherein the first memory use report indicates a first amount of memory for a first process at a first time and a third amount of memory for a second process at the first time and the second memory use report indicates a second amount of memory for the first process at a second time and a fourth amount of memory for the second process at the second time;

determining, by the leak detection system, a first memory profile for the first process using the first memory use report and the second memory use report;

analyzing the first memory profile;

determining that the first process generates memory leaks on the user device;

determining, by the leak detection system, a second memory profile for memory of the second process using the first memory use report and the second memory use report;

analyzing the second memory profile; and determining that the second memory profile does not indicate that the second process has a memory leak.

6. The method of claim 5, wherein the first amount of memory for the first process at the first time comprises the first amount of memory for the first process to a first memory type, wherein the first memory use report further comprises an indication of the third amount of memory for the second process to a second memory type at the first time, wherein the second amount of memory for the first process at the second time comprises the second amount of memory for the first process to the first memory type, and wherein the second memory use report further comprises an indication of the fourth amount of memory for the second process to the second memory type at the second time.

7. The method of claim 6, further comprising determining, by the leak detection system, that the first amount of memory and the second amount of memory are to be used for determining the first memory profile.

8. The method of claim 6, wherein the first memory type is at least one of: virtual machine memory; Dalvik memory; anonymous memory; graphical memory; or data memory.

9. The method claim 5, wherein analyzing the first memory profile further comprises:

determining, by the leak detection system, a filtered memory profile by applying a filter to the first memory profile; and searching, by the leak detection system, the filtered memory profile for one or more characteristics indicative of a memory leak.

10. The method of claim 9, wherein searching the filtered memory profile for one or more characteristics indicative of a memory leak comprises determining that the filtered memory profile exhibits a monotonic linear increase over time.

11. The method of claim 5, further comprising:

receiving, by the leak detection system and from the user device, a memory heap dump associated with the first process, wherein the memory heap dump associated with the first process indicates memory used by one or more objects associated with the first process.

12. The method of claim 11, further comprising generating, by the leak detection system, a memory leak report that indicates that the first process generated a memory leak on the user device, wherein the report includes the memory heap dump.

13. A leak detection system, comprising:

at least one memory that stores computer-executable instructions; and at least one processor that accesses the at least one memory and is operationally coupled to a transceiver, wherein the at least one processor is configured to:

receive a first memory use report and a second memory use report associated with a user device, wherein the first memory use report indicates a first amount of memory for a first process at a first time and a third amount of memory for a second process at the first time and the second memory use report indicates a second amount of memory for the first process at a second time and a fourth amount of memory for the second process at the second time;

determine a first memory profile for the process using the first memory use report and the second memory use report;

determine, using the first memory profile, that the first process generates memory leaks on the user device;

determine a second memory profile for memory of the second process using the first memory use report and the second memory use report; and determine, using the second memory profile, that the second process does not indicate a memory leak.

14. The leak detection system of claim 13, wherein the first amount of memory for the first process at the first time comprises the first amount of memory for the first process to a first memory type, wherein the first memory use report further comprises an indication of the third amount of memory for the second process to a second memory type at the first time, wherein the second amount of memory for the first process at the second time comprises the second amount of memory for the first process to the first memory type, and wherein the second memory use report further includes an indication of the fourth amount of memory for the second process to the second memory type at the second time.

15. The leak detection system of claim 14, further comprising determining, by the leak detection system, that the first amount of memory and the second amount of memory are to be used for determining the first memory profile.

16. The leak detection system of claim 13, wherein the at least one processor is configured to determine that the first process generates memory leaks on the user device by determining that the first memory profile exhibits a monotonic linear increase over time.

17. The leak detection system of claim 13, wherein the at least one processor is further configured to:

receive, from the user device, a memory heap dump associated with the first process, wherein the memory heap dump associated with the first process indicates memory used by one or more objects associated with the first process.

18. The leak detection system of claim 17, wherein the at least one processor is further configured to generate a memory leak report that indicates that the first process generated a memory leak on the user device, wherein the report includes the memory heap dump.

* * * * *